United States Patent
Chow et al.

(10) Patent No.: US 9,104,504 B2
(45) Date of Patent: Aug. 11, 2015

(54) SYSTEMS AND METHODS FOR EMBEDDED SHARED LIBRARIES IN AN EXECUTABLE IMAGE

(71) Applicants: Alex C. Chow, Austin, TX (US); John P. Harvey, Round Rock, TX (US)

(72) Inventors: Alex C. Chow, Austin, TX (US); John P. Harvey, Round Rock, TX (US)

(73) Assignee: Dell Products LP, Round Rock, TX (US)

( * ) Notice: Subject to any disclaimer, the term of this patent is extended or adjusted under 35 U.S.C. 154(b) by 203 days.

(21) Appl. No.: 13/800,870

(22) Filed: Mar. 13, 2013

(65) Prior Publication Data

US 2014/0282457 A1    Sep. 18, 2014

(51) Int. Cl.
G06F 9/445 (2006.01)

(52) U.S. Cl.
CPC .. *G06F 8/54* (2013.01); *G06F 8/65* (2013.01); *G06F 9/44521* (2013.01)

(58) Field of Classification Search
None
See application file for complete search history.

(56) References Cited

U.S. PATENT DOCUMENTS

| | | | | |
|---|---|---|---|---|
| 6,052,778 A * | 4/2000 | Hagy et al. | | 713/2 |
| 6,141,698 A * | 10/2000 | Krishnan et al. | | 719/331 |
| 6,363,436 B1 * | 3/2002 | Hagy et al. | | 719/331 |
| 6,438,621 B1 * | 8/2002 | Kanamori et al. | | 719/331 |
| 6,986,133 B2 * | 1/2006 | O'Brien et al. | | 717/173 |
| 7,428,737 B1 * | 9/2008 | Borghesani et al. | | 719/332 |
| 8,510,422 B2 * | 8/2013 | Phung et al. | | 709/222 |
| 8,595,715 B2 * | 11/2013 | Ward et al. | | 717/170 |
| 8,793,676 B2 * | 7/2014 | Quinn et al. | | 717/163 |
| 2004/0162930 A1 * | 8/2004 | Forin et al. | | 711/1 |
| 2005/0039196 A1 * | 2/2005 | Sasidharan | | 719/331 |
| 2005/0278718 A1 * | 12/2005 | Griffith et al. | | 717/175 |
| 2006/0095898 A1 | 5/2006 | Chow et al. | | |
| 2006/0190532 A1 | 8/2006 | Chadalavada | | |
| 2006/0212143 A1 | 9/2006 | Nguyen et al. | | |
| 2007/0288913 A1 * | 12/2007 | Chou et al. | | 717/163 |
| 2008/0022380 A1 * | 1/2008 | Lu et al. | | 726/9 |
| 2009/0133042 A1 * | 5/2009 | Forin et al. | | 719/331 |
| 2009/0259999 A1 * | 10/2009 | Srinivasan | | 717/170 |
| 2010/0180265 A1 * | 7/2010 | Tsai et al. | | 717/140 |
| 2011/0078293 A1 * | 3/2011 | Phung et al. | | 709/222 |
| 2012/0174124 A1 * | 7/2012 | Ward et al. | | 719/331 |

(Continued)

OTHER PUBLICATIONS

Jaesoo Lee; Jiyong Park; Seongsoo Hong, Memory Footprint Reduction with Quasi-Static Shared Libraries in MMU-less Embedded Systems, [Online] Apr. 2006, Real-Time and Embedded Technology and Applications Symposium, [Retrieved from the Internet] <http://ieeexplore.ieee.org/stamp/stamp.jsp?tp=&arnumber=1613320&isnumber=33866> pp. 24-36.*

(Continued)

*Primary Examiner* — Thuy Dao
*Assistant Examiner* — Ravi K Sinha
(74) *Attorney, Agent, or Firm* — Egan, Peterman & Enders LLP.

(57) ABSTRACT

Systems and methods are provided for deploying new software application features as a dynamically-loadable executable package including one or more dynamically-linked shared dependent libraries. The dynamically-loadable executable package may be capable of being loaded into volatile memory and executed in an information handling system environment with or without the dependent shared libraries, and without duplicating the presence or use of redundant shared libraries that may be already present on the existing software stack.

22 Claims, 9 Drawing Sheets

(56) References Cited

U.S. PATENT DOCUMENTS

2012/0240106 A1\* 9/2012 Lander et al. ................. 717/163
2014/0068583 A1\* 3/2014 Tejani et al. ................. 717/163

OTHER PUBLICATIONS

Beazley, D.M.; Ward, B.D.; Cooke, I.R., The inside story on shared libraries and dynamic loading, [Online] 2001, Computing in Science & Engineering, vol. 3, No. 5, pp. 90,97, Sep./Oct. 2001, [Retrieved from the Internet] <http://ieeexplore.ieee.org/stamp/stamp.jsp?tp=&arnumber=947112&isnumber=20508>.\*

Franz, M., Dynamic linking of software components, [Online] 1997, Computer, vol. 30, No. 3, pp. 74,81, Mar. 1997, [Retrieved from the Internet] <http://ieeexplore.ieee.org/stamp/stamp.jsp?tp=&arnumber=573670&isnumber=12418>.\*

Wikipedia, "Executable and Linkable Format" Printed from Internet Feb. 21, 2013, 7 pgs.

Wikipedia, "Weak Symbol", Printed from Internet Mar. 8, 2013, 2 pgs.

\* cited by examiner

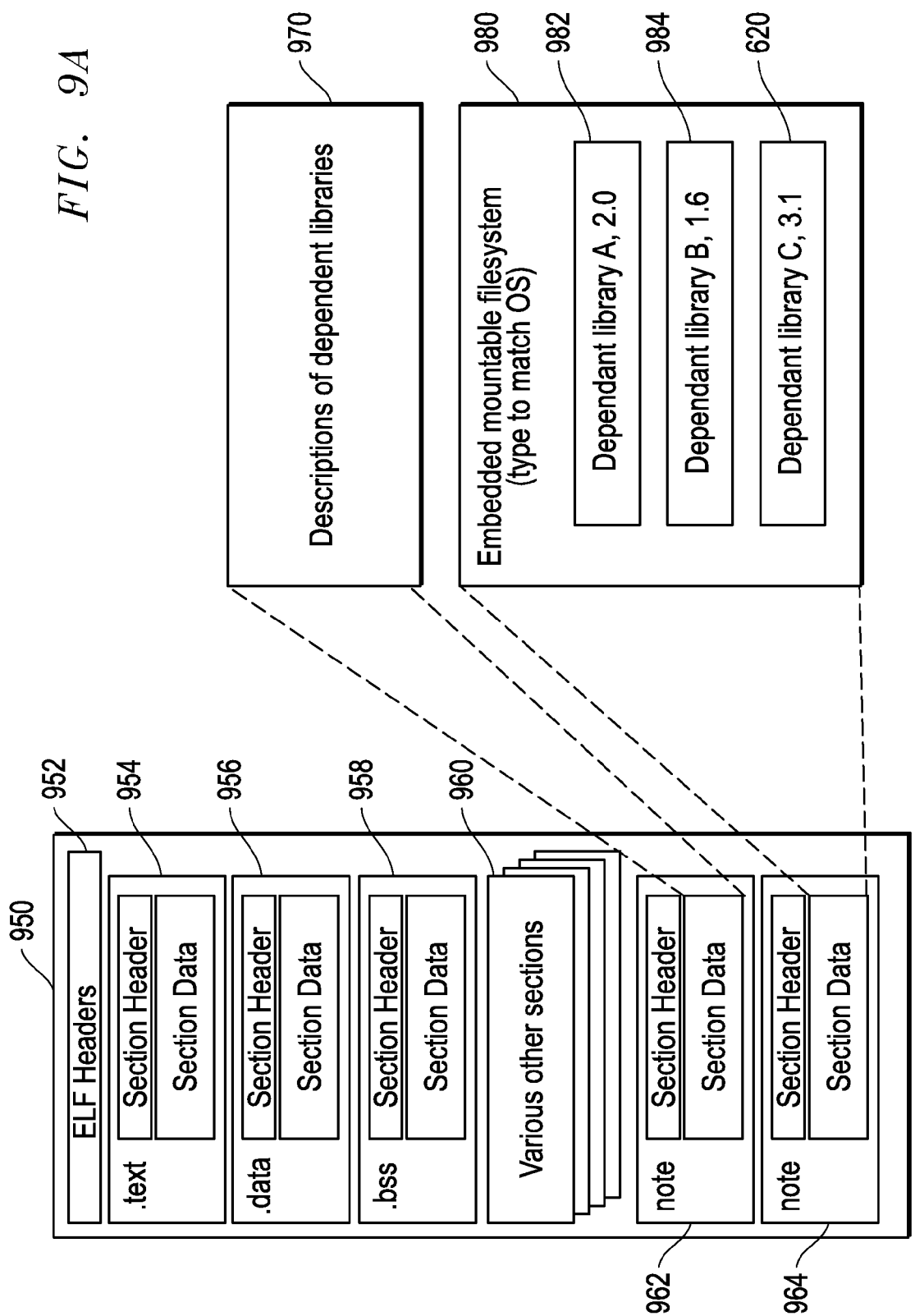

SYSTEMS AND METHODS FOR EMBEDDED SHARED LIBRARIES IN AN EXECUTABLE IMAGE

FIELD OF THE INVENTION

This invention relates generally to information handling systems and, more particularly, to embedded shared libraries.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Deploying a new software application or program feature for an information handling system may require an updated target software stack to satisfy prerequisite shared libraries for the new application. Thus, the target software stack must be updated to the compatible version of the dependent libraries before the shared library version of the application can be executed. However, the installation of an additional (updated) library package may be intrusive to the stability of the software library or operability of a data center operation in which other applications are executing. To address this problem, the required updated library or libraries may be statically linked to the new application so that the dynamically-linked shared libraries of the software stack do not have to be updated. However, such a conventional approach increases the runtime memory usage when the dependent shared libraries are actually already available in the target stack.

FIG. 1 is a simplified diagram that shows a conventional relationship of software and hardware components of an information handling system 100. In particular, FIG. 1 shows an application 102 running with an operating system (OS) 104 on hardware 106 (including processing device) of the information handling system 100 using dynamic linking and first (non-upgraded) versions of shared libraries 110a-110d. Application 102 is contained in private memory space of volatile random access memory (RAM) of information handling system 100, and dynamically-linked shared libraries 110a-110d are contained in shared memory space of RAM of information handling system 100. In this way, dynamically-linked shared libraries 110a-110d are available to other applications loaded into RAM of information handling system 100.

FIG. 2 shows another conventional relationship of software and hardware components of the example information handling system 100. In particular, FIG. 2 shows the same application 102 running with an operating system (OS) 104 on hardware 106 (including processing device) of the information handling system 100 using updated dynamically-linked shared libraries 120a-120d which represent upgraded versions of the libraries of FIG. 1 that are contained in shared memory space of random access memory RAM of information handling system 100, and therefore available to other applications loaded into RAM of information handling system 100.

FIG. 3 shows another conventional relationship of software and hardware components of the example information handling system 100. In particular, FIG. 3 shows the same application 102 loaded into system RAM and running with an operating system (OS) 104 on hardware 106 (including processing device) of the information handling system 100. Also present in RAM are non-upgraded dynamically-linked shared libraries 110a-110d. As shown, an additional statically-linked upgraded library 120c that is needed by application 102 is also included in the application image that is contained in the private memory space of application 102. In this case, upgraded statically-linked library 120c is needed by application 102, and non-upgraded dynamically-linked library 110c remains present in shared memory space but is not used by application 102. Non-upgraded dynamically-linked library 110c is, however, available for use by any other application that needs this version of library 110c. Therefore, in the conventional case of FIG. 3, RAM memory space is required to simultaneously contain both non-upgraded library version 110c and upgraded library version 120c. In the case that upgraded library version 120c is already loaded in RAM as a dynamically-linked shared library, then the additional RAM memory space required to contain upgraded statically-linked library 120c that is loaded with application 102 image is wasted.

FIG. 4A is a simplified flowchart showing conventional methodology 400 for loading of an application 102 from relatively inexpensive disk or other non-volatile storage into relatively expensive volatile system RAM, followed by linking, and running of the application on hardware of an information handling system. As shown, methodology 400 starts in step 402, where an executable application file (in Extensible Linking Format or Executable and Linkable Format "ELF") is parsed. Next, in step 404, shared dependent libraries needed by the application are found, loaded (if needed) into system RAM and linked-to in an iterative manner. In step 406, if not all shared dependent libraries needed by the application are found to be present, then methodology 400 proceeds to step 408 where an error is reported and the methodology ends. However if all shared dependent libraries needed by the loaded application are found to be present, methodology 400 proceeds to step 410 where the shared dependent libraries are evaluated for compatibility with the application by determining if all symbols referenced by the application are present in the existing shared dependent libraries. If all referenced symbols are not resolved or present in the existing libraries, then methodology 400 proceeds to step 412 where an error is reported and the methodology ends. However if all referenced symbols are resolved, and then final full application image is successfully linked and loaded, then the application is run in step 414 as shown.

FIG. 4B is a simplified illustration of the contents of a conventional executable application program object file 450 in ELF format for an application 102. As shown, file format 450 includes ELF headers 452, text section 454, data section

456, bss section 458 and various other sections 460. Each of sections 452, 456 and 458 include a respective header and data as shown.

Weak symbol binding as used in compilers like GNU compiler collection (GCC) with "#pragma weak" and "_attribute_((weak))" allow a symbol to have special properties when dynamic linking with libraries is used. One use is to allow an application to adapt to differing versions of support libraries. If the application would like to use a feature in a new version of a library, but the runtime of the information handling system has an older version of that library, the symbol will be zero or NULL.

SUMMARY OF THE INVENTION

Disclosed herein are systems and methods for deploying new software application features as a dynamically-loadable executable package including one or more dynamically-linked shared dependent libraries. The dynamically-loadable executable package may be capable of being loaded into volatile memory and executed in an information handling system environment with or without the dependent shared libraries, and without duplicating the presence or use of redundant shared libraries that may be already present on the existing software stack. In one exemplary embodiment, relatively abundant and less expensive non-volatile memory space may be leveraged in a manner that conserves relatively scarce and expensive runtime volatile memory space.

In one embodiment, the disclosed systems and methods may be advantageously implemented in a manner that simplifies the software module upgrade maintenance, increase the system stability, and reduce data center upgrade cost. In this regard, newly released or upgraded software application/s may be loaded into volatile memory and executed even when the existing target software stack in memory does not contain all the dynamically-linked shared libraries required to satisfy the dependency required by the newly released or upgraded software application/s, and without requiring installation of newer shared libraries or versions thereof into the existing software stack that may cause incompatibility with other existing software applications. At the same time, the newly released or upgraded software application/s may be selectably loaded into system memory and executed without loading redundant libraries into system memory where the existing target software stack in memory already contains all the new or upgraded dynamically-linked shared libraries required to satisfy the dependency required by the newly released or upgraded software application/s. Thus, in the case where an existing target software stack in volatile memory public space already contains all the dynamically-linked shared libraries required to satisfy the dependency required by a given application, then no dynamically-linked shared dependent libraries are required to be extracted and loaded from a dynamically-loadable executable package so that volatile memory space is conserved.

In one respect, disclosed herein is an information handling system, including: at least one processing device, the processing device being configured to execute a runtime loader module and at least one application; non-volatile system memory coupled to the processing device, the non-volatile memory containing an executable application file including the at least one application, the executable application file also including an embedded file system image segment that contains one or more dynamically-linkable dependent shared library versions selected for use by the at least one application when it is executed; and volatile system memory coupled to the processing device, the volatile system memory being configured to contain the application in private memory space and being further configured to contain one or more dynamically-linkable runtime dependent shared library versions in first shared memory space that are available to be accessed by the application from the application private memory space during execution on the processing device. The at least one processing device may be configured to execute the runtime loader module to: load the application from the executable application file into the application private memory space of the volatile system memory, selectably load one or more shared dependent library versions from the embedded file system image segment into a second shared memory space of the volatile system memory that is separate and different from the first shared memory space, and dynamically link the loaded application to the one or more shared dependent library versions loaded from the embedded file system image segment into the second shared memory space of the volatile system memory.

In another respect, disclosed herein is a method of loading and executing an application on at least one processing device of an information handling system, the method including the steps of: using the processing device to load one or more dynamically-linkable runtime dependent shared library versions in a first shared memory space of volatile memory of the information handling system, the dynamically-linkable runtime dependent shared library versions in the shared memory space being available to be accessed by applications executing on the processing device; using the processing device to load an application from an executable application file contained in non-volatile memory of the information handling system into an application private memory space of volatile system memory of the information handling system, the executable application file including the at least one application and an embedded file system image segment that contains one or more dynamically-linkable dependent shared library versions selected for use by the at least one application when it is executed; using the processing device to selectably load one or more shared dependent library versions from the embedded file system image segment into a second shared memory space of the volatile system memory that is separate and different from the first shared memory space; using the processing device to dynamically link the loaded application to the one or more shared dependent library versions loaded from the embedded file system image segment into the second shared memory space of the volatile system memory; and using the processing device to execute the loaded application on the at least one processing device of the information handling system.

BRIEF DESCRIPTION OF THE DRAWINGS

FIG. 9A is a simplified illustration of the contents of an executable application or program object file according to one exemplary embodiment of the disclosed systems and methods.

DESCRIPTION OF ILLUSTRATIVE EMBODIMENTS

Figure 1:
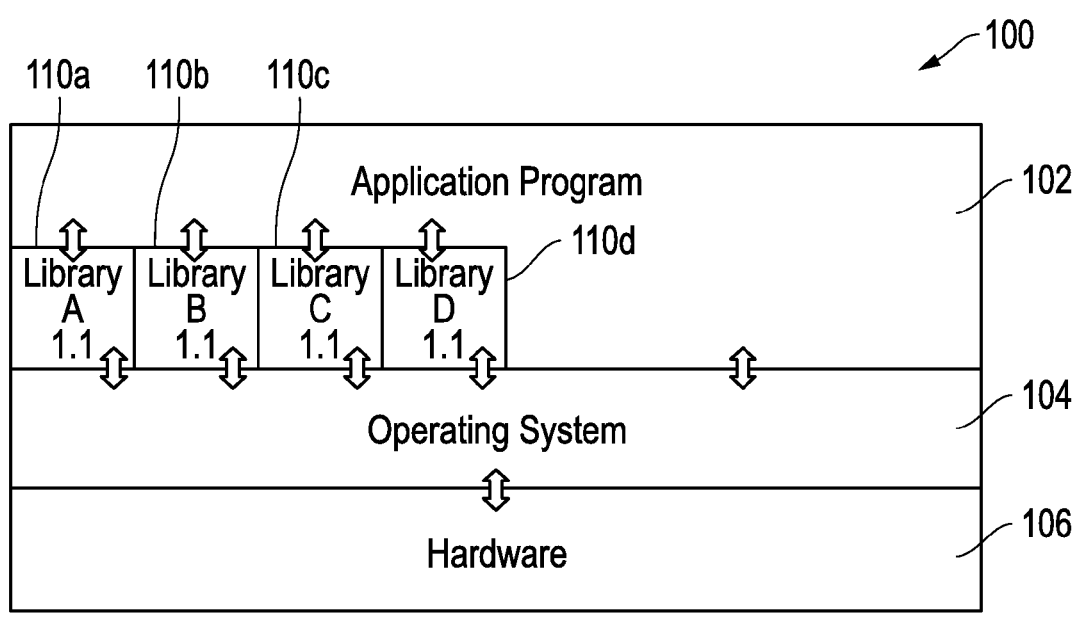
FIG. 1 is a simplified diagram that shows a conventional relationship of software and hardware components of an information handling system.
Figure 2:
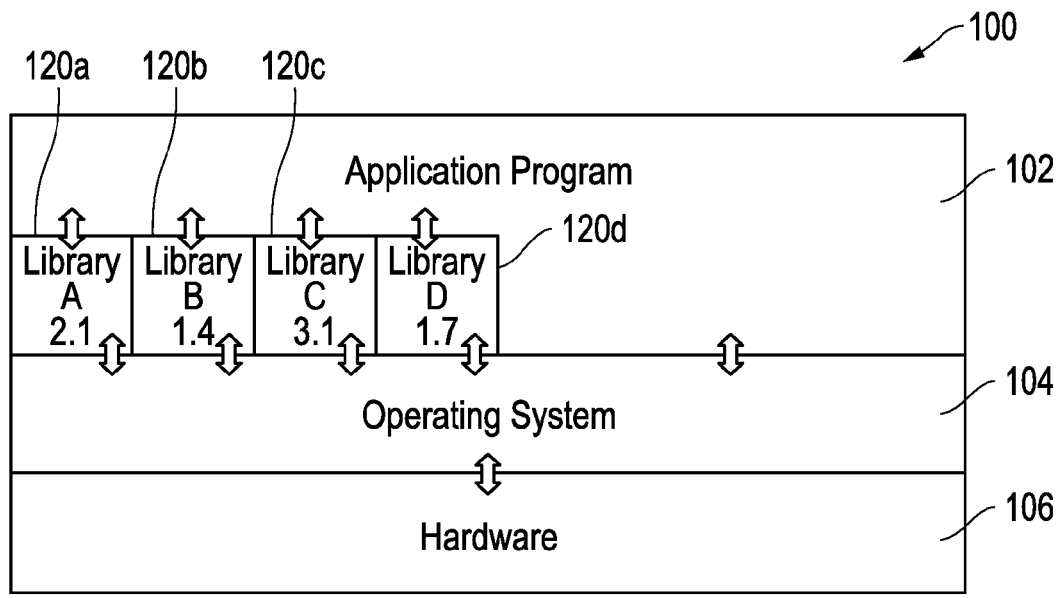
FIG. 2 is a simplified diagram that shows a conventional relationship of software and hardware components of an information handling system.
Figure 3:
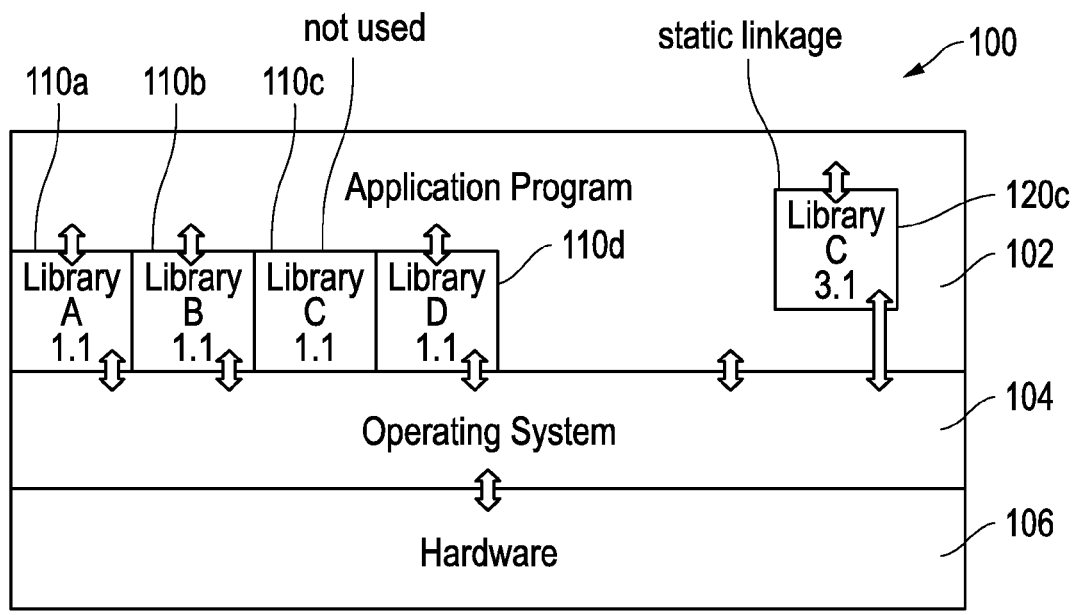
FIG. 3 is a simplified diagram that shows a conventional relationship of software and hardware components of an information handling system.
Figure 4A:
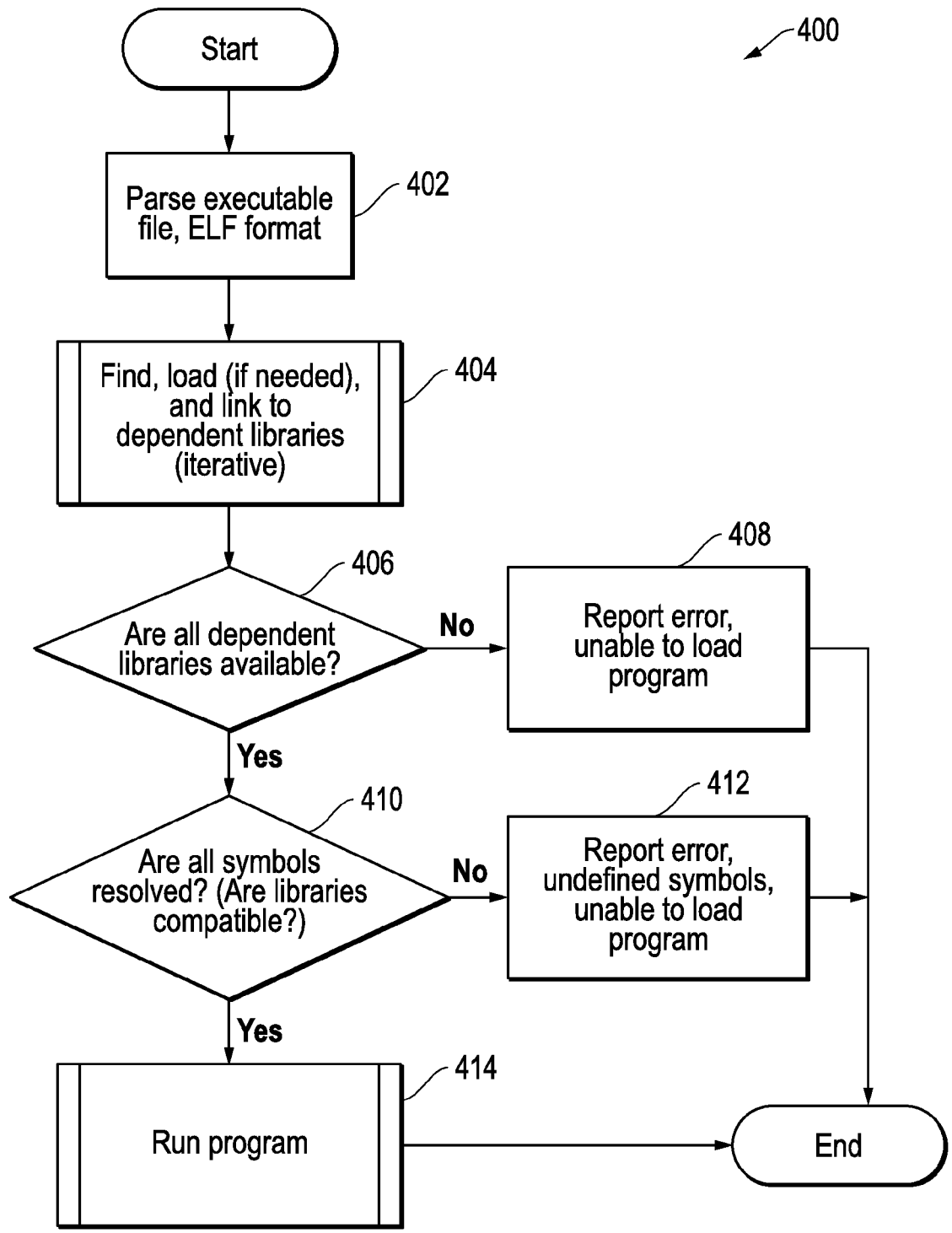
FIG. 4A is a simplified flowchart showing conventional methodology for loading of an application into system RAM, followed by linking, and running of the application on hardware of an information handling system.
Figure 4B:
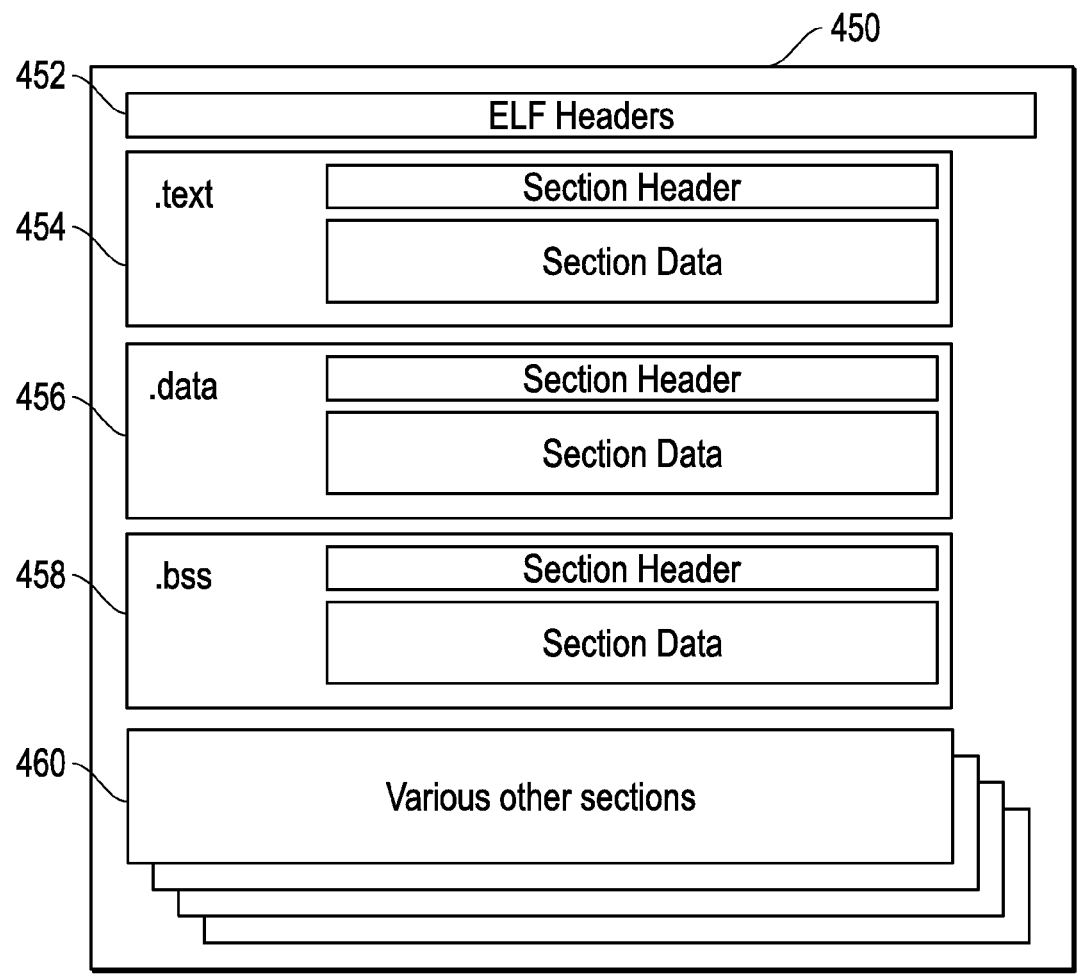
FIG. 4B is a simplified illustration of the contents of a conventional executable application program object file for an application.
Figure 5:
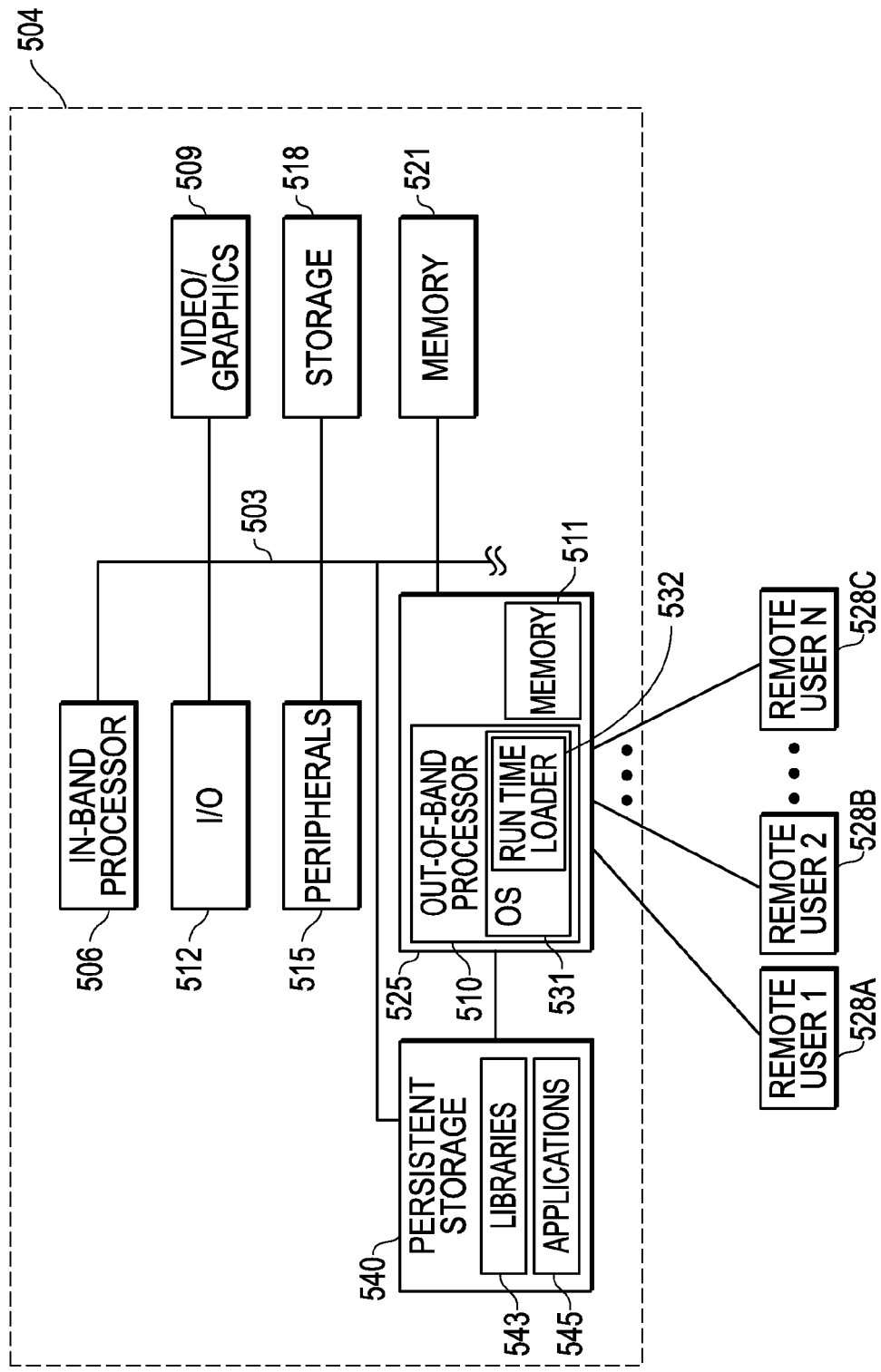
FIG. 5 is a simplified block diagram of an information handling system according to one exemplary embodiment of the disclosed systems and methods.

FIG. 5 is a block diagram of one exemplary embodiment of an information handling system 504 (e.g., such as a cloud computing server) upon which new software application features may be deployed as a dynamically-loadable executable package including one or more dynamically-linked shared dependent libraries. As shown, system 504 may include one or more in-band processors 506, one or more buses or communication media 503, video/graphics hardware 509, storage 518, memory 521, input/output (I/O) 512, peripherals 515, and a remote access controller (RAC) 525 having one or more out-of-band processors 510 and volatile system memory 511. In this embodiment, out-of-band processor 510 is executing an operating system (OS) 531 that includes a runtime dynamic loader module 532 that is configured to dynamically load executable software packages in a manner as described further herein.

Still referring to FIG. 5, bus 503 provides a mechanism for the various components of system 504 to communicate and couple with one another. In-band processor 506 may include a Host processor (e.g., CPU) running a host operating system (OS) for system 504, and out-of-band processor 510 may be a service processor, embedded processor, etc. Video/graphics 509, storage 518, memory 521, I/O 512 and peripherals 515 may have the structure, and perform the functions known to those of skill in the art. Besides memory 521 (e.g., RAM), processor 506 may include cache memory for storage of frequently accessed data, and storage 518 may include extended memory for processor 506. It will be understood that the embodiment of FIG. 5 is exemplary only, and that an information handling system may be provided with one or more processing devices that may perform the functions of processor 506, processor 510, remote access controller 525, and other optional processing devices. Examples of such processing devices include, but are not limited to, central processing units (CPUs), embedded controllers, microcontrollers, application specific integrated circuits (ASICs), field programmable gate arrays (FPGAs), etc. It will also be understood that the particular configuration of FIG. 5 is exemplary only, and that other information handling system architectures may be employed in the practice of the disclosed systems and methods that are suitable for dynamically loading executable software packages in a manner as described herein, e.g., including system architectures those having one or more different components and/or fewer or greater number of system components.

The disclosed systems and methods may be implemented in one exemplary embodiment using a plug-in architecture framework to allow extension of server management functionalities (e.g., using Dell unified server configuration ("USC") server management functionalities available from Dell Products L.P. of Round Rock, Tex.) in a unified extension firmware interface ("UEFI") environment by leveraging available remote access controller core or optional flash memory space. Further information on implementation of USC functionalities in a UEFI environment may be found, for example, in U.S. patent application Ser. No. 12/587,001 filed Sep. 30, 2009 which published as United States Patent Publication 20110078293, and which is incorporated herein by reference in its entirety for all purposes. Among other things, the disclosed systems and methods may be implemented to provide a hardware and software interface to allow use of a plug-in framework in the embedded system management that may be run under the BIOS firmware and the UEFI environment. The disclosed systems and methods may also be implemented to provide a USC server management architecture that may be modified and enhanced over time, and/or that may also be employed to extend availability of the USC server management framework to remote users 528.

Still referring to FIG. 5, remote access controller 525 provides access to a plurality of remote users 528A-128C, although access may be provided to a single user 528 in other embodiments. In this regard, remote access controller 525 allows remote users to manage, administer, use, and/or access various resources of information handling system 504 (e.g., either native or virtual) from a remote location. However, remote or local access may be provided to information handling system 504 using any other configuration.

In the exemplary embodiment of FIG. 5, remote users 528A-128C may have in-band or out-of-band access to system 504 as desired. For example, remote users 528A-128C may have wired and/or wireless access through a local area network (LAN), wide area network (WAN), wireless local area network (WLAN), wireless wide area network (WWAN), dial-up modem, etc. In one embodiment, remote access controller (RAC) 525 may be an integrated Dell Remote Access Controller (iDRAC) available from Dell Products L.P. of Round Rock, Tex. Further information on such a remote access controller may be found in United States Patent Application Publication Number 2006/0212143 and United States Patent Application Publication Number 2006/0190532, each of which is incorporated herein by reference in its entirety. However, it will be understood that other configurations of remote access controllers may be suitably employed in other embodiments.

As further shown, remote access controller 525 is coupled to remote access controller persistent storage 540 (e.g., non-volatile random access memory "NVRAM" such as embedded and partitioned flash memory, Electrically Erasable Programmable Read Only Memory—EEPROM, etc.), upon which one or more server management applications forming part of a USC framework may be stored in addition to one or more other applications 545, libraries 543 and other functions, e.g., BIOS, unified extensible firmware interface ("UEFI") modules, etc. In the embodiment of FIG. 5, persistent storage 540 is managed by remote access controller 525 and may be utilized for deploying new software application feature/s by loading such feature/s 545 together with any required libraries 543 from persistent storage 540 into volatile system memory 511 of RAC 525. In one exemplary embodiment, persistent storage 540 may be embedded in the system motherboard and may be, for example, about 1 GB in size although any other suitable locations and/or other sizes of persistent memory may be utilized.

In FIG. 5, runtime loader 532 may be executing as a kernel that is part of service processor OS 531. It will also be understood that in one exemplary embodiment, runtime loader 532 may be ported and compiled on both in-band processor (e.g., CPU) 506 and out-of-band processor (e.g., service processor) 511. Further, although FIG. 5 illustrates one exemplary embodiment in which application feature/s are deployed from persistent storage 540 to system memory 511 of a RAC 525 out-of-band processor (e.g., service processor) 525, it will be understood that the disclosed systems and methods may be implemented to deploy application feature/s from any other type of non-volatile memory (e.g., such as storage 518) to any other type of volatile system memory (e.g. such as memory 521), for example, using a runtime loader that executes on in-band processor 506. It will also be understood that advantages of the disclosed systems and methods may be realized when implemented on other types and configurations of information handling systems having one or more processing devices that execute application features that are loaded together with required libraries from non-volatile memory into volatile system memory.

Figure 6:
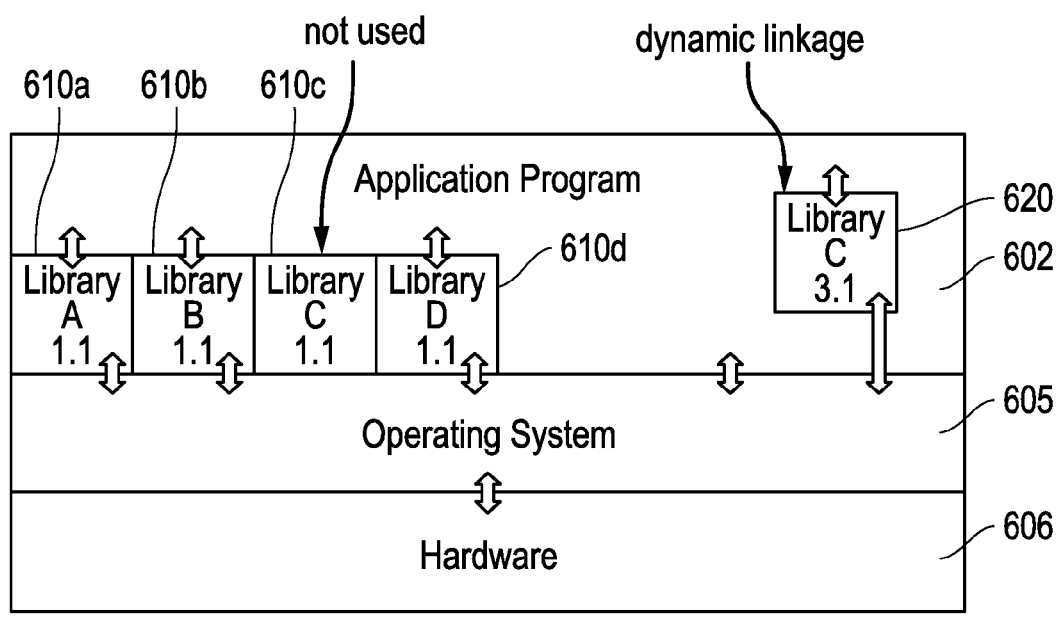
FIG. 6 is a simplified diagram that shows a relationship of software and hardware components of an exemplary information handling system according to one exemplary embodiment of the disclosed systems and methods.
Figure 7:
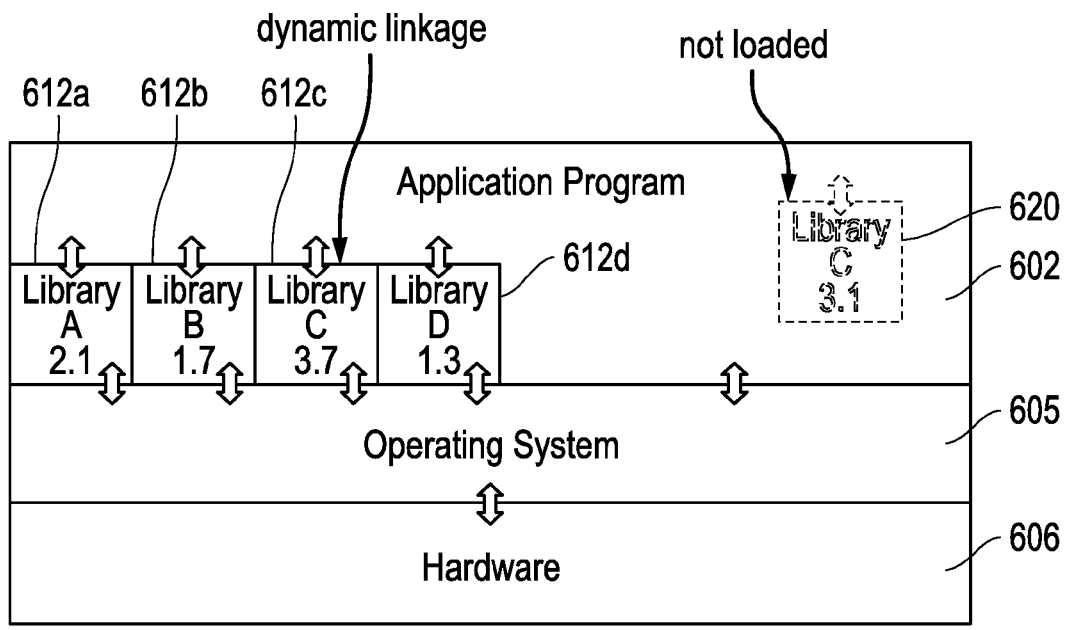
FIG. 7 is a simplified diagram that shows a relationship of software and hardware components of an exemplary information handling system according to one exemplary embodiment of the disclosed systems and methods.
Figure 8:
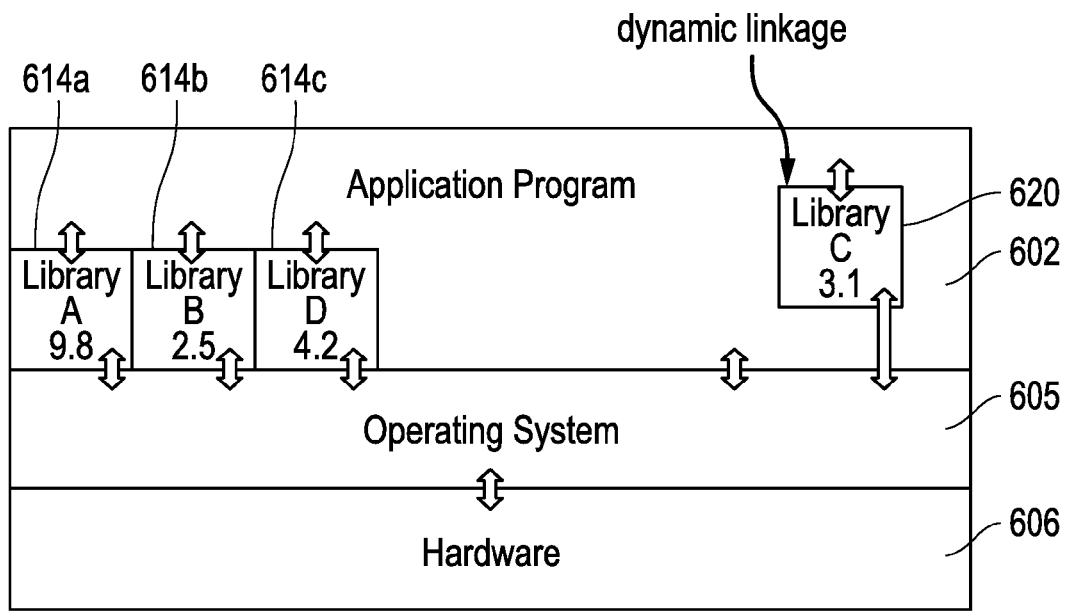
FIG. 8 is a simplified diagram that shows a relationship of software and hardware components of an exemplary information handling system according to one exemplary embodiment of the disclosed systems and methods.

FIG. 6 is a simplified diagram that shows a relationship of software and hardware components of an exemplary information handling system 504 such as illustrated and described in relation to FIG. 5. In this regard, FIGS. 6-8 are described further herein in relation to the information handling system embodiment of FIG. 5, although it will be understood that the disclosed systems and methods may be implemented using any other suitable configuration of one or more processing devices operatively coupled to non-volatile and volatile memory devices.

Returning to FIG. 6, shown is an application 602 running with an operating system (OS) 605 on hardware 606 that in one embodiment includes processing device 510 of the information handling system 504 using dynamic linking and first (non-upgraded) versions of runtime shared libraries A to D, which are labeled in FIG. 6 as 610a-610d, respectively. In this embodiment, application 602 is loaded into private memory space of volatile system memory 511 of information handling system 504, and dynamically-linked shared libraries 610a-610d are loaded (e.g., loaded from service processor firmware of out-of band processing device 510) and contained in shared memory space of system memory 511 of information handling system 504, and are available to other applications loaded into system memory 511 of information handling system 504.

In the exemplary embodiment, of FIG. 6, application 602 requires a version of Library C upgraded at version 3.0 or higher, which is not present among the dynamically-linked shared libraries 610a-610d that are contained in shared memory space of system memory 511 of information handling system 504. Thus, application 602 includes an upgraded version 620 of Library C that is embedded in the private image of application 602 as shown. Dynamically-linked version 620 of Library C may be selectably loaded from an embedded image file of application 602 into system memory 511 together with the remainder of the image of Application 602 from non-volatile memory 540. In this configuration, application 602 executes using dynamically-linked shared libraries 610a, 610b, and 610d that are contained in shared memory space of system memory 511 and using embedded dynamically-linked upgraded version 620 of Library C that is contained in shared memory space of system memory 511 that is separate from the shared memory space where dynamically-linked shared libraries 610a, 610b, and 610d are contained. Application 602 does not use the non-upgraded public version 610c of Library C, although other applications executing on information handling system 504 may still access and use the non-upgraded public version 610c of Library C as needed.

FIG. 7 again shows a relationship of software and hardware components of an exemplary information handling system 504. In FIG. 7, particular, application 602 is again loaded in system memory 511 and is running on hardware 606 of information handling system 504. However, in this case, dynamically-linked shared versions of upgraded libraries A-D are also installed in shared memory space of system memory 511, and labeled as 612a-612d, respectively. In particular, upgraded version 3.7 of shared Library C 612c is already installed in shared memory space and satisfies the needs of application 602, and is therefore used by application 602 while it is executing on system 504. In such a case, embedded version 620 of Library C is not needed since shared library 612c satisfies the needs of application 602, and in this case is a higher upgraded version of Library C than embedded version 620 (which is version 3.1). Thus, an embedded file system image that includes version 620 of Library C is selectably not loaded into volatile system memory 511 when the rest of the image of application 602 is loaded into volatile memory 511 from non-volatile memory 540. Application 602 instead uses dynamically-linked shared libraries 612a-612d. Because embedded version 620 of Library C is not loaded into system memory 511, valuable volatile memory space is saved in such a case. This is indicated in FIG. 7 where embedded version 620 of Library C is shown in dashed outline to indicate that it is not loaded (i.e., missing) and therefore not present in system memory 511.

FIG. 8 again shows a relationship of software and hardware components of an exemplary information handling system 504. In FIG. 8, particular, application 602 is again loaded in system memory 511 and is running on hardware 606 of information handling system 504. In this illustrated example, dynamically-linked shared versions of upgraded libraries A, B and D are also installed in shared memory space of system memory 511, and labeled as 614a, 614b and 614c, respectively. In this case, no version of Library C is installed in shared memory space to satisfy the needs of application 602 while it is executing on system 504. In such a case, embedded version 620 of Library C is needed, and is therefore selectably loaded as part of private image of application 602 into volatile system memory 511 together with the rest of the image of application 602 when application 602 is loaded into volatile memory 511 from non-volatile memory 540. As shown, embedded version 620 of Library C is dynamically-linked in this case to application 602.

FIG. 9A is a simplified illustration of the contents of an executable application or program object file 950 (e.g., for an application 602) that may in one embodiment be employed in the practice of the disclosed systems and methods. Executable object file 950 may be created for an executable application (e.g., such as Windows Notepad or other program) that is compiled and linked as shared. A reasonable number of the dependent shared libraries for the application (e.g., 982, 984, 620), with a reasonable exclusion of libraries already in a common baseline, may be embedded into an mountable file system image 980, e.g., such as /myshared/lib*.so3. File system image 980 may then be embedded into the executable image (e.g., ELF format) 950 as a special segment as shown. The file system structure, the library versioning, and other related library information may also be placed in another object file note segment 970 or alternatively contained in any other suitable form within object file 950. File note segment 970 may also include a list of the embedded libraries contained in file system image 980.

As shown in FIG. 9A, object file format 950 includes ELF headers 952, text section 954 (including application code), data section 956, bss section 958 and various other sections 960. Each of sections 954, 956 and 958 include a respective header and data as shown. As shown, object file 950 also includes note sections 962 and 964 that each include header and data. In particular, note section 962 contains data 970 that includes description (e.g., including a listing of libraries and library versions) of the embedded dependent libraries contained in file system image 980 of note section 964. Note section 964 of object file 950 itself contains data in the form of an embedded mountable file system 980 that itself includes selected required dependent library data for a given application 602 (e.g., in this case version 982 of dependent Library A, version 984 of dependent Library B, and version 620 of dependent Library C). As shown, mountable file system 980 may be particularized or customized to include library types that match the given operating system 605. It will be understood that contents of object file 950 of FIG. 9A is exemplary only, and that any other configuration of an object file may be employed that contains one or more dependent libraries as an embedded mountable files system therein.

Figure 9B:
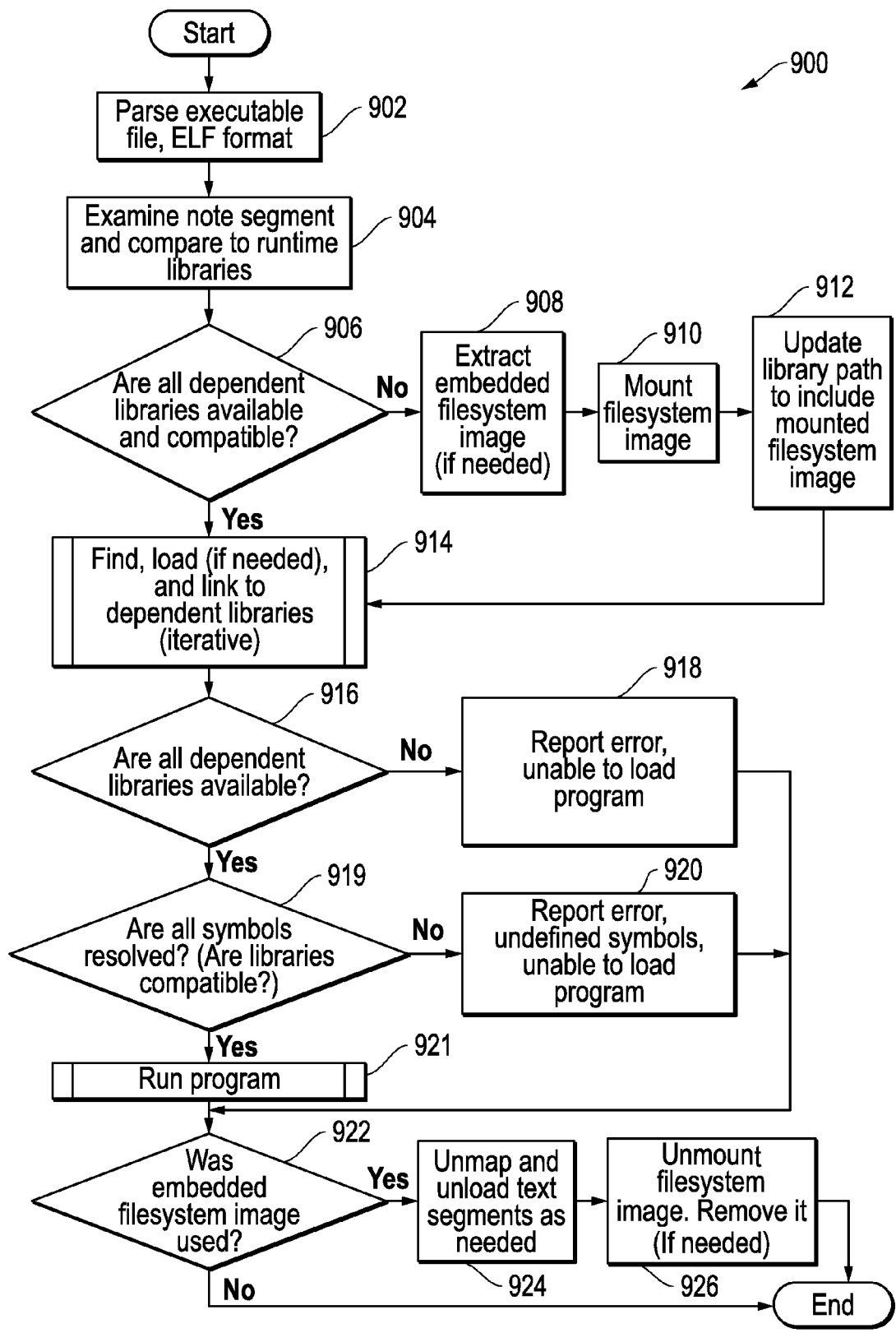
FIG. 9B is a simplified flowchart illustrating methodology according to one exemplary embodiment of the disclosed systems and methods for loading of a given application from non-volatile memory into volatile system memory, followed by linking, and running of the loaded application on hardware of an information handling system.

FIG. 9B is a simplified flowchart showing one exemplary embodiment of a methodology 900 for loading of a given application (e.g., such as application 602 of FIGS. 6-8) from relatively inexpensive magnetic or optical storage disk or other non-volatile memory (e.g., such as persistent storage 540) into relatively expensive volatile system memory 521 (e.g., system RAM), followed by linking, and running of the loaded application on hardware 606 of an information handling system 504. In this regard, the following description of FIG. 9B will refer to the exemplary embodiments of FIGS. 5-9A to facilitate description of methodology 900. However, it will be understood that methodology 900 may implemented for loading, linking and running one or more applications as part of any other configuration of information handling system hardware that includes at least one processing device and system memory.

As shown in FIG. 9B, methodology 900 starts in step 902, where an executable object file (in Executable and Linkable Format "ELF") for the application 602 that is to be loaded and executed is parsed by runtime dynamic loader 532. Next, in step 904, data section 970 of note segment 962 (which describes and/or identifies dependent libraries present in file system image 980 and required runtime shared libraries for application 602) is examined by runtime loader 532 and compared to dependent library runtime shared libraries already installed in shared system memory 511. Then, in step 906, if examination of note segment/s of the file image finds that all libraries required by application 602 are currently available in the shared memory of the system memory 511 (e.g., including upgraded version 612c of Library C as illustrated in the exemplary embodiment of FIG. 7), then methodology 900 proceeds to step 914 where text segment 954 of application 602 is loaded and all shared libraries required by application 602 are found, loaded and linked to loaded application 602 as dependent libraries in a usual fashion. In this case, the embedded file system image segment 980 is not extracted by runtime loader 532 from the applicable note section 964 of the object file 950, and no libraries are required to be loaded into volatile memory from image segment 980. Thus volatile memory space is conserved in memory 511. It is further noted that step 914 may be iteratively performed because each library that is loaded may depend on other libraries. Therefore, once a given library is loaded, it may depend on a second library that is not loaded yet. The second library is therefore then loaded and it may depend on a third library, etc. This process is therefore repeated in step 914 as needed.

However, if in step 906, the dependency is not met and not all libraries required by application 602 are found to be currently available in the shared memory of the system memory 511 (e.g., required version of Library C is missing as illustrated in the exemplary embodiment of FIG. 8 and/or other required libraries are missing), then methodology 900 proceeds to step 908 where the embedded file system image segment 980 (e.g., including upgraded version 620 of Library C of FIG. 8 and/or any other missing libraries) is extracted by runtime loader 532 from the applicable note section 964 of the object file 950. The extracted embedded file system image segment 980 is then mounted in step 910 by runtime loader 532. Then, in step 912, the library search path for application 602 is updated to a new library path including the mounted file system dependent library image containing the embedded dependent shared libraries, and methodology 900 proceeds to step 914 where text segment 954 of application 602 is loaded and where all libraries required by application 602 are found, loaded and linked to application 602 as dependent libraries in a usual manner.

Still referring to FIG. 9B, methodology 900 proceeds next to step 916 where it is determined whether all required non-embedded dependent libraries are now present and available in the shared space of system memory 511 (i.e., after performing steps 908-912 if needed). If not all shared dependent libraries needed by the application 602 are now found to be present on system memory in step 916 (e.g., there is dependency on a library that is not present in either system memory or embedded file system image segment 980), then methodology 900 proceeds to step 918 where an error is reported (e.g., "unable to load application") and methodology 900 proceeds to step 922 that is described further below. However if all shared dependent libraries needed by the loaded application are found to be present and available in the shared space of system memory 511 (e.g., as libraries 614a, 614b and 614d of FIG. 8), then methodology 900 proceeds to step 919 where the non-embedded shared dependent libraries are evaluated for compatibility with the application 602 by determining if all symbols referenced by the application 602 are present in the existing non-embedded shared dependent libraries. If all referenced symbols are not resolved or present in the existing non-embedded libraries, then methodology 900 proceeds to step 920 where an error is reported (e.g., "undefined symbols and unable to load application") and methodology 900 proceeds to step 922 that is described further below. However if all referenced symbols are resolved in step 918, then the application 602 is run in step 921 as shown.

Methodology 900 proceeds to step 922 from each of steps 918 and 920, and from step 920 after application 602 is finished running and ready to exit. In step 922, it is determined whether an embedded file system image library was used (e.g., such as illustrated in FIG. 8). If not, then application 602 exits and methodology 900 ends at this time. However, if embedded file system image 980 was used, then methodology 900 proceeds from step 922 to step 924 where the mount point is unmounted, text segment 954 is unmapped and unloaded as needed, and then to step 926 where the file system image 980 is unmounted and removed if needed, before ending with application exit as shown in FIG. 9B.

It will be understood that methodology 900 is exemplary only, and that any other combination of fewer, additional, and/or alternative steps (or order thereof) may be employed that is suitable for loading, linking and running an application or any other type of executable object together with required dependent libraries on an information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will be understood that one or more of the tasks, functions, or methodologies described herein may be implemented, for example, as firmware or other computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of loading and executing an application on at least one processing device of an information handling system, the method comprising:

using the processing device to load one or more dynamically-linkable runtime dependent shared library versions in a first shared memory space of volatile memory of the information handling system, the dynamically-linkable runtime dependent shared library versions in the shared memory space being available to be accessed by applications executing on the processing device;

using the processing device to load an application from an executable application file contained in non-volatile memory of the information handling system into an application private memory space of volatile system memory of the information handling system, the executable application file including the at least one application and an embedded file system image segment that is embedded into the executable application file, the embedded file system image segment containing one or more dynamically-linkable dependent shared library versions that are embedded into the embedded file system image segment and selected for use by the at least one application when it is executed;

using the processing device to selectably load one or more shared dependent library versions from the embedded file system image segment into a second shared memory space of the volatile system memory that is separate and different from the first shared memory space;

using the processing device to dynamically link the application loaded from the executable application file to the one or more shared dependent library versions loaded from the embedded file system image segment of the executable application file into the second shared memory space of the volatile system memory; and using the processing device to execute the loaded application loaded from the executable application file on the at least one processing device of the information handling system.

2. The method of claim 1, where the executable application file also includes embedded library version information that indicates the identity of all dependent library versions required by the application; and where the method further comprises:

using the processing device to examine the embedded library version information of the executable application file to determine the identity of all dependent library versions required by the application;

using the processing device to determine the identity of the any dynamically-linkable runtime dependent shared library versions currently contained in shared memory space of the volatile system memory;

using the processing device to compare the determined identity of all dependent library versions required by the application to the determined identity of any dynamically-linkable runtime dependent shared library versions currently contained in the shared memory space of the volatile system memory to determine if any dependent library versions required by the application are not currently contained in shared memory space of the volatile system memory; and using the processing device to selectably load one or more shared dependent library versions from the embedded file system image segment into the second shared memory space of the volatile system memory that correspond to any dependent library versions required by the application that are not currently contained in the first shared memory space of the volatile system memory.

3. The method of claim 2, further comprising using the at least one processing device to not load the application from the executable application file into private memory space of the volatile system memory if it is determined that one or more shared library versions are not contained in either of the first shared memory space of the volatile system memory or the embedded file system image segment.

4. The method of claim 2, where the executable application file includes a first note section, the first note section including data in the form of the embedded file system image segment, and the embedded file system image segment of the first note section including the one or more embedded dynamically-linkable dependent shared library versions that are selected for use by the at least one application when it is executed; where the executable application file includes a second note section, the second note section including data that describes or identifies the one or more embedded dynamically-linkable dependent shared library versions that are embedded into the embedded file system image segment; and where the method further comprises using the processing device to examine the description or identification of the one or more embedded dynamically-linkable dependent shared library versions contained in the embedded file system image segment of the first note section prior to using the processing device to selectably load one or more shared dependent library versions from the embedded file system image segment into the second shared memory space of the volatile system memory that correspond to any dependent library versions required by the application that are not currently contained in the first shared memory space of the volatile system memory.

5. The method of claim 1, where the executable application file includes a first application, the executable application file also including an embedded file system image segment that contains one or more dynamically-linkable dependent shared library versions selected for use by the first application; where the one or more dynamically-linkable runtime dependent shared library versions in the first shared memory space are available to be accessed by each of the first and a second application from the private memory space of each respective different application during execution on the processing device; and where the method further comprises using the at least one processing device to:
  execute the first application and the second different application; and
  selectably load at least one given shared dependent library version required by the first application but not required by the second application from the embedded file system image segment into the second shared memory space of the volatile system memory that corresponds to the first application when the given shared dependent library version is not currently contained in first shared memory space of the volatile system memory;
  where at least one given shared dependent library version is required by the first application but not required by the second application.

6. The method of claim 5, further comprising using the at least one processing device to:
  selectably load the at least one given shared dependent library version required by the first application but not required by the second application from the embedded file system image segment into the second shared memory space of the volatile system memory that corresponds to the first application when the given shared dependent library version is not currently contained in the first shared memory space of the volatile system memory without modifying the one or more dynamically-linkable runtime dependent shared library versions in the first shared memory space.

7. The method of claim 5, where the embedded library version information also includes a list of the one or more embedded dependent library versions contained in the file system image; and where the at least one processing device is further configured to execute the runtime loader to:
  compare the one or more shared library versions that are not contained in the first shared memory space of the volatile system memory to the one or more embedded dependent library versions contained in the file system image; and
  not load the application from the executable application file into private memory space of the volatile system memory if it is determined by the runtime loader that one or more shared library versions are not contained in the first shared memory space and are not included in the list of the one or more embedded dependent library versions contained in the file system image.

8. The method of claim 1, where the information handling system is a server that includes a remote access controller (RAC); and where the information handling system further comprises:
  an out-of-band processing device of the RAC that is configured to execute the runtime loader module; and
  an in-band processing device coupled to the out-of-band processing device, the in-band processing device being a separate processing device from the out-of-band processing device;
  where the volatile system memory comprises volatile random access memory (RAM) of the RAC; and
  where the non-volatile memory comprises persistent storage coupled to the out-of band processing device of the RAC.

9. The method of claim 8, where the out-of-band processing device comprises a service processor or embedded processor running a service processor OS; and where the in-band processor comprises a host central processing unit (CPU) running a host OS for the information handling system.

10. The method of claim 1, where the executable application file includes a first note section, the first note section including data in the form of the embedded file system image segment, and the embedded file system image segment of the first note section including the one or more embedded dynamically-linkable dependent shared library versions that are selected for use by the at least one application when it is executed.

11. An information handling system, comprising:
  at least one processing device, the processing device being configured to execute a runtime loader module and at least one application;
  non-volatile system memory coupled to the processing device, the non-volatile memory containing an executable application file including the at least one application, the executable application file also including an embedded file system image segment that is embedded into the executable application file, the embedded file system image segment containing one or more dynamically-linkable dependent shared library versions that are embedded into the embedded file system image segment and selected for use by the at least one application when it is executed; and
  volatile system memory coupled to the processing device, the volatile system memory being configured to contain the application loaded from the executable application file in private memory space and being further configured to contain one or more dynamically-linkable runtime dependent shared library versions in first shared memory space that are available to be accessed by the application from the application private memory space during execution on the processing device;
  where the at least one processing device is configured to execute the runtime loader module to:
    load the application from the executable application file into the application private memory space of the volatile system memory,
    selectably load one or more shared dependent library versions from the embedded file system image segment of the executable application file into a second shared memory space of the volatile system memory that is separate and different from the first shared memory space, and
    dynamically link the loaded application to the one or more shared dependent library versions loaded from the embedded file system image segment of the executable application file into the second shared memory space of the volatile system memory.

12. The information handling system of claim 11, where the executable application file also includes embedded library version information that indicates the identity of all dependent library versions required by the application; and where the at least one processing device is further configured to execute the runtime loader to:
examine the embedded library version information of the executable application file to determine the identity of all dependent library versions required by the application;
determine the identity of the any dynamically-linkable runtime dependent shared library versions currently contained in shared memory space of the volatile system memory;
compare the determined identity of all dependent library versions required by the application to the determined identity of any dynamically-linkable runtime dependent shared library versions currently contained in the shared memory space of the volatile system memory to determine if any dependent library versions required by the application are not currently contained in shared memory space of the volatile system memory; and
selectably load one or more shared dependent library versions from the embedded file system image segment into the second shared memory space of the volatile system memory that correspond to any dependent library versions required by the application that are not currently contained in the first shared memory space of the volatile system memory.

13. The information handling system of claim 12, where the at least one processing device is further configured to execute the runtime loader to not load the application from the executable application file into private memory space of the volatile system memory if it is determined by the runtime loader that one or more shared library versions are not contained in either of the first shared memory space of the volatile system memory or the embedded file system image segment.

14. The information handling system of claim 12, where the executable application file includes a first note section, the first note section including data in the form of the embedded file system image segment, and the embedded file system image segment of the first note section including the one or more embedded dynamically-linkable dependent shared library versions that are selected for use by the at least one application when it is executed; where the executable application file includes a second note section, the second note section including data that describes or identifies the one or more embedded dynamically-linkable dependent shared library versions that are embedded into the embedded file system image segment; and where the at least one processing device is further configured to execute the runtime loader to examine the description or identification of the one or more embedded dynamically-linkable dependent shared library versions contained in the embedded file system image segment of the first note section prior to selectably loading one or more shared dependent library versions from the embedded file system image segment into the second shared memory space of the volatile system memory that correspond to any dependent library versions required by the application that are not currently contained in the first shared memory space of the volatile system memory.

15. The information handling system of claim 11, where the at least one processing device is configured to execute the runtime loader module together with a first application and second different application; where the executable application file includes the first application, the executable application file also including an embedded file system image segment that contains one or more dynamically-linkable dependent shared library versions selected for use by the first application; where the volatile system memory is configured to contain one or more dynamically-linkable runtime dependent shared library versions in the first shared memory space that are available to be accessed by each of the the first and second applications from the private memory space of each respective different application during execution on the processing device; and where the at least one processing device is further configured to execute the runtime loader to:
selectably load at least one given shared dependent library version required by the first application but not required by the second application from the embedded file system image segment into the second shared memory space of the volatile system memory that corresponds to the first application when the given shared dependent library version is not currently contained in first shared memory space of the volatile system memory;
where at least one given shared dependent library version is required by the first application but not required by the second application.

16. The information handling system of claim 15, where the at least one processing device is further configured to execute the runtime loader to:
selectably load the at least one given shared dependent library version required by the first application but not required by the second application from the embedded file system image segment into the second shared memory space of the volatile system memory that corresponds to the first application when the given shared dependent library version is not currently contained in the first shared memory space of the volatile system memory without modifying the one or more dynamically-linkable runtime dependent shared library versions in the first shared memory space.

17. The information handling system of claim 15, where the embedded library version information also includes a list of the one or more embedded dependent library versions contained in the file system image; and where the at least one processing device is further configured to execute the runtime loader to:
compare the one or more shared library versions that are not contained in the first shared memory space of the volatile system memory to the one or more embedded dependent library versions contained in the file system image; and
not load the application from the executable application file into private memory space of the volatile system memory if it is determined by the runtime loader that one or more shared library versions are not contained in the first shared memory space and are not included in the list of the one or more embedded dependent library versions contained in the file system image.

18. The information handling system of claim 11, where the information handling system is a server that includes a remote access controller (RAC); and where the information handling system further comprises:
an out-of-band processing device of the RAC that is configured to execute the runtime loader module; and
an in-band processing device coupled to the out-of-band processing device, the in-band processing device being a separate processing device from the out-of-band processing device;

where the volatile system memory comprises volatile random access memory (RAM) of the RAC; and where the non-volatile memory comprises persistent storage coupled to the out-of band processing device of the RAC.

19. The information handling system of claim 18, where the out-of-band processing device is configured to execute a first operating system (OS); and where the runtime loader module is configured as a kernel of the first OS.

20. The information handling system of claim 18, where the out-of-band processing device is configured to execute a first operating system (OS); where the in-band processing device is configured to execute a second operating system (OS); and where the runtime loader module is ported and compiled on both the in-band processor and the out-of-band processor.

21. The information handling system of claim 18, where the out-of-band processing device comprises a service processor or embedded processor running a service processor OS; and where the in-band processor comprises a host central processing unit (CPU) running a host OS for the information handling system.

22. The information handling system of claim 11, where the executable application file includes a first note section, the first note section including data in the form of the embedded file system image segment, and the embedded file system image segment of the first note section including the one or more embedded dynamically-linkable dependent shared library versions that are selected for use by the at least one application when it is executed.

* * * * *